Dec. 1, 1953  A. C. HAGER ET AL  2,661,081
HYDRAULIC BRAKE CONTROL
Filed Sept. 16, 1950
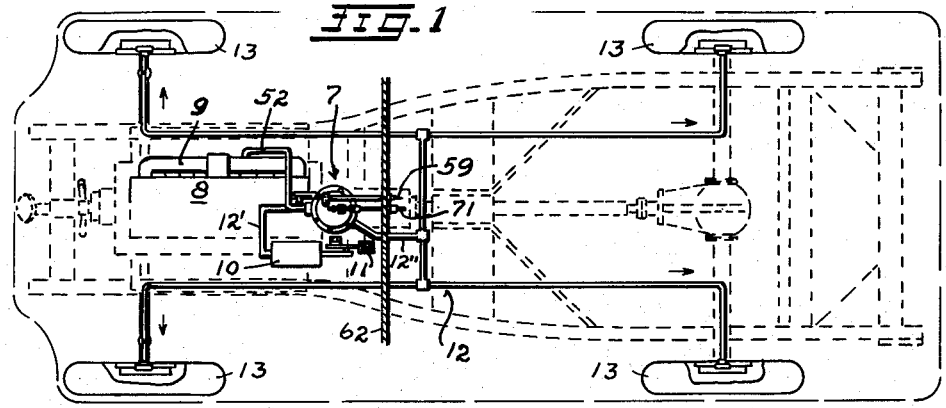
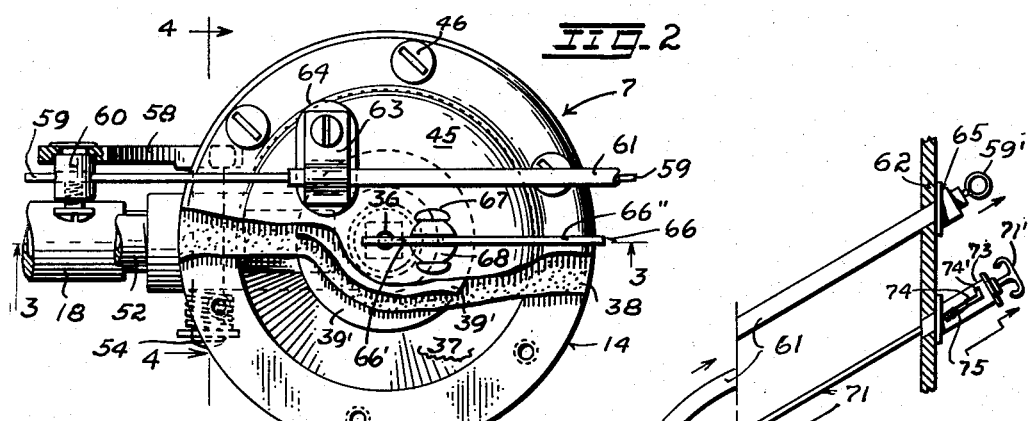
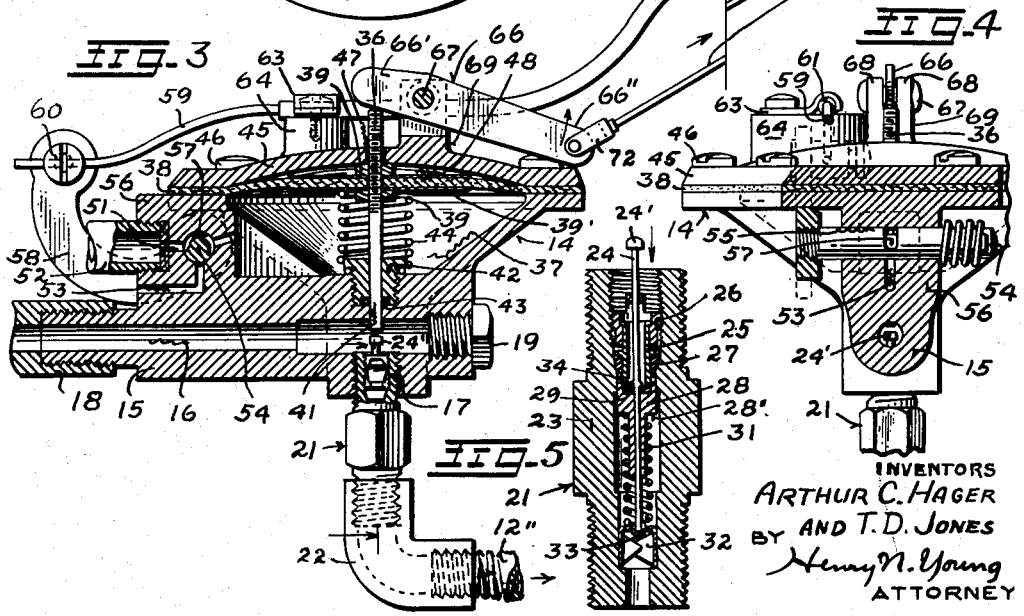
INVENTORS
ARTHUR C. HAGER
AND T. D. JONES
BY Henry N. Young
ATTORNEY Patented Dec. 1, 1953

2,661,081

UNITED STATES PATENT OFFICE 2,661,081

HYDRAULIC BRAKE CONTROL

Arthur C. Hager and Ted D. Jones,
Berkeley, Calif.

Application September 16, 1950, Serial No. 185,312

12 Claims. (Cl. 188—152)

The invention relates to hydraulic brake systems of motor-driven vehicles, and particularly to an auxiliary control of such systems.

A general object is to provide an improved means for automatically and releasably holding set the hydraulic brakes of motor-driven vehicles under both normal and emergency conditions.

Another object is to provide a device of the character described which is self-contained and is readily installed in cooperative association with various present hydraulic brake systems.

A further object is to provide a means for locking the brakes in set condition when the engine is either running or stopped.

Yet another object is to provide a brake-holding means which, while holding the brakes locked while the engine is stopped, is arranged for its release by starting the engine or by an independently operable manual means.

The invention possesses other objects and features of advantage, some of which, with the foregoing, will be set forth or be apparent in the following description of a typical embodiment and installation thereof, and in the accompanying drawings, in which, Figure 1 is a diagrammatic plan view illustrating a portion of a motor-driven vehicle showing the present auxiliary brake control cooperatively associated with the engine and the brake system of the vehicle.

Figure 2 is a plan view of the control unit of the device, portions of the structure being broken away.

Figure 3 is a sectional elevation of the unit taken at the line 3—3 in Figure 2.

Figure 4 is a fragmentary sectional elevation taken at the line 4—4 in Figure 2.

Figure 5 is an enlarged sectional view of a check valve of the control unit.

As particularly illustrated, a control unit 7 embodying our invention is shown as applied to a four-wheel brake system of a self-propelled vehicle arranged for its propulsion by an internal combustion engine (motor) 8 having a fuel intake manifold 9. The hydraulic brake system to which the present unit 7 is applied comprises a usual piston pump unit 10 arranged for its actuation by a foot pedal 11 and having a discharge pipe 12 suitably branched to supply the braking liquid at the same pressure to the brakeband controls of the four vehicle wheels 13 and to return the liquid to the pump when the pedal 11 is released from its brake-setting position.

The present control unit 7 includes a body member 14 which is interposed in the unbranched portion of the pipe 12 to connect fixedly-supported pipe portions 12' and 12" at a vehicle point from which certain controls for the unit may best be actuated. As particularly shown, an elongated lower body portion 15 provides a straight duct 16 extending longitudinally therethrough and provided with a downwardly-directed branch duct 17 adjacent one end of the duct 16. Either end of the duct 16 is arranged for its connection to the pipe section 12' as may be convenient; in the present instance, one end of the body portion 15 is externally threaded for mounting a coupling member 18 for the pipe section 12' while the other duct end is closed by a screw plug 19. A check valve unit 21 is mounted at the branch duct 17 to provide a connection between the duct 16 and the discharge pipe section 12", as through an elbow fitting 22.

It will now be noted that the check valve unit 21 is essentially of a spring-loaded type which is so installed between the duct 16 and the fitting 22 that it may operate to prevent a return flow of liquid to the pump 10 following the release of the pedal 11 from its brake-setting displacement. The structure of the present check-valve unit is particularly disclosed in Figure 5 as being that of a usual type of pneumatic tire-inflation valve, and essentially comprises a tubular body 23 having its bore progressively stepped inwardly from one end to cooperatively receive a usual valve assembly having a displaceable valve-opening stem 24 extending from the larger end of the body bore for the disposal of its head 24' in the duct 16 when the corresponding body end is fixedly and threadedly engaged in the branch duct 17. As is usual for the present type of valve, the stem 24 extends freely through a central bore provided in a tubular member 25 which is sealedly and removably held fixed in the bore of the valve body 23 by and between a sleeve nut 26 threadedly engaging the bore of the valve body at its larger and outer end portion, and a tapered sealing ring 27 engaged between the member and a complementary seat provided in the valve body bore inwardly of the sleeve nut 26.

A member 28 is freely slidable in the bore of the valve body 23 below the seat for the sealing ring 27 and slidably receives the valve stem 24 therethrough for a guided centering of the member in the bore. The upper end of the member 28 is cupped to carry a sealing annulus 29 for normal passage-closing engagement with the inner end of the member 25 under the influence of a helical compression spring 31 which is operative between the member 28 and a generally cup-shaped spring seat member 32 which engages the innermost step of the valve body bore, a bottom portion of the member 28 being reduced below a shoulder 28' to receive the spring about it while the shoulder provides the outer seat for the spring. The top of the spring seat member 32 slidably receives the inner end portion of the valve stem 24 through it, and the inner end of the stem is enlarged at 33 to prevent a withdrawal of the stem from the member. Intermediately thereof, and outwardly of the seat provided by the sealing annulus 29, the stem 24 is provided with a radial enlargement 34 which is arranged to constantly seat upon the annulus by reason of the coaction of the spring 31 between the members 28 and 32.

Noting that the installed check-valve assembly is primarily so operative that the brake control fluid may pass only toward the wheel brakes except while the valve is closed, means are provided for either pneumatically or manually opening the check valve in accordance with a desired normal or emergency brake control. Since under normal movements of the vehicle the release of the depressed brake pedal 11 should permit a release of the brakes by reason of a return of the brake-operating liquid to the pump 10, the check valve 21 is arranged to be automatically opened and held open during the operation of the vehicle-propulsion engine 8 by a means which is preferably arranged to hold the check valve open during and by reason of the suction in the intake manifold 9 of the operating engine. In its present embodiment, a suitable pressure-sensitive servo-motor is provided by the control unit 7 to actuate a thrust-stem 36 against the head 24' of the stem 24 axially of the latter, the disclosed servo-motor being of the suction-operated diaphragm type.

As is particularly disclosed in Figure 3, the body 14 of the control unit 7 provides a chamber 37 opposite the branch duct 17, said chamber being defined at its outer side by a circular flexible diaphragm 38 which carries the thrust stem 36 centrally therethrough in coaxial relation to it and to the check-valve stem. The thrust stem 36 extends from a point within the duct 16 to a point beyond the diaphragm, and is secured in appropriate relation to the diaphragm by means of clamp nuts 39 threadedly engaging it at opposite sides of the diaphragm and operative through annular plates 39' engaging the diaphragm between them. The chamber 39 is of generally conical form with the diaphragm 38 defining its larger end, and the thrust stem 36 is slidably engaged through a body bore 41 and a gland nut 42 which threadedly engages an enlarged portion of the bore 41 to compress a packing ring 43 about the stem. A helical compression spring 44 in the chamber 37 axially receives the stem 36 for constantly and yieldingly urging the diaphragm outwardly to dispose the lower end of the stem 36 spaced from the opposed valve stem head 24' by reason of its engagement between a plate 39' and a spring seat provided about the packing nut 42 at the opposed chamber end.

A cap plate 45 has its rim portion releasably applied against and around the rim portion of the diaphragm 38 for sealedly securing the diaphragm to the unit body 14, and screws 46 applied through the plate and diaphragm releasably fix the plate to the body to provide for the installation of the diaphragm and the thrust stem 36 carried by it. The inner face of the plate 45 is spherically concave opposite the chamber 37, and is engageable by the upper nut 39 for limiting the displacement of the diaphragm beyond the plane of the body face engaged by its rim portion. A hole 47 through the plate 45 freely receives the upper end portion of the stem 36 therethrough to extend somewhat beyond it for its engagement to provide for an axial valve-opening displacement of the stem against the resistance of the spring 44 independently of any suction-induced movement of the diaphragm to provide the same action. The space 48 defined between the diaphragm and the plate is vented to atmosphere for maintaining an atmospheric pressure at that side of the diaphragm; in the present instance, the hole 47 provides the necessary vent about the stem 36 therethrough.

It will now be noted that a duct 51 extends generally radially from the chamber 37 through the unit body to a connection at the side of the body with a suction pipe or line 52 which has its other end connected to the space of the engine intake manifold 9. As particularly brought out in Figure 3, the outer end of the duct 51 is enlarged to provide a socket for a threaded and sealed securing of the end of the suction pipe 52 to the body 14 thereat, while the other end of the pipe 52 is suitably connected to the intake manifold wall. A branch duct 53 extends from an intermediate point of the duct 51 to the exterior face of the body, and a rotary two-way valve is operative at the juncture of the duct 53 with the duct 51 for its alternative setting to connect the chamber 37 with the suction pipe 52 or with atmosphere for venting the chamber 37. In the present structure, the plug portion of the two-way valve is provided by a rotary member 54 which is rockable in a bearing bore 55 provided through a body portion 56 extending radially of the central body part and laterally upwardly from the body portion 15 which provides the liquid duct 16. The member 54 is provided with a groove 57 extending part way around it in the plane of the ducts 51 and 53 and is thereby arranged to provide the desired two-way valve connection of the chamber 37 with the suction pipe 52 or to atmosphere. The member 54 is suitably held against its axial shifting whereby the portion thereof at the groove 57 is understood to function as a rotary valve plug and may be so referred to.

A control arm 58 extends radially from one end of the member 54 to a connection with a push-and-pull rod 59 by which the member may be rocked between limiting positions in which the space of the chamber 37 is alternatively connected to the suction pipe 52 or to the relief duct 53, the former connection being illustrated in Figures 2 and 3. As particularly shown, the rod 59 extends from a swivel connection 60 with the arm 58 through a flexible conduit 61 to a terminal finger loop 59' thereof which is accessible to the vehicle operator at the usual instrument panel 62, or other suitable point in the operator's compartment of the vehicle. In the present arrangement, one end of the conduit 61 is adjustably fixed by a clamp plate 63 to a boss 64 extending integrally from the cap plate 45, while the other conduit end is fixed in a member 65 mounted on the instrument panel 62. The positioning control means thus provided for the rotary valve member 54 is preferably such that the valve may be frictionally retained in either limiting set position thereof. It will be understood that when the valve member 54 is disposed as illustrated in Figures 3 and 4, the suction of the operating engine is arranged to function to displace the diaphragm against the resistance of the spring 44 to apply the stem 36 against the stem 24 of the check valve to open the latter. When the valve member 54 is disposed to connect the chamber 37 with the relief duct 53, the chamber is simultaneously cut off from any connection with the suction line and contains air at atmospheric pressure for all diaphragm positions.

The independent positioning control for the thrust stem 36 for opening the check valve 21 is arranged to be effected by the operation against its extending end of a lever 66 which is swingably and intermediately mounted upon a fulcrum pin 67 carried by and between spaced ears 68 provided by a boss 69 extending integrally from the plate 45. In the present instance, the lever 66 is swingable in a plane which is radial to the stem 36 while an arm 66' thereof engages the top of the stem. A push-and-pull rod 71 extends from a swivel connection 72 with the other lever arm 66'' and through a tubular member 73 mounted on the panel 62 to a terminal pull grip 71' of the rod. A longitudinal slot 74 in the member 73 constantly receives a radial pin 75 extending from the rod 71, and is provided with a lateral extension or notch 74' at its outer end for receiving the pin 73 to releasably hold the rod in a limiting pulled-out position in which the thrust stem 36 is operative against the valve stem 24 to open the check valve 21 against the resistance of the spring 44.

Having a vehicle equipped with the present hydraulic brake control device, the hydraulic brakes may be set and released under control of the pedal 11 in a normal manner while the engine is operating to hold open the spring-loaded check valve 21 by the suction of the engine intake manifold. A stopping of the engine operation, either deliberately or by a "stalling" of the engine, results in the elimination of the suction-induced servo-motor action to permit a closing of the spring-loaded check valve to thereafter hold the brakes which may have been held set until the engine suction ceases to hold the check valve open, or have been set after the engine operation stops. If the engine operation is stopped while the vehicle is on a slope, the setting and holding of the hydraulic brakes will alone retain the vehicle in its stopped position independently of any separate system of mechanical brakes with which the vehicle may be provided for emergency use; in this manner, the present control is understood to itself provide an emergency "hill-holding" means for vehicles as supplementary to any independent emergency brakes of the vehicle.

Should it be desirable to leave the vehicle standing with its engine running and its hydraulic brakes set, it is only necessary to close off the suction line 52 at the rotary valve 54 and set the hydraulic brakes by providing liquid under pressure from the hydraulic pump 10, it being noted that such a vehicle-operating condition is frequently desirable. Such a control is of marked value, for instance, in the case of vehicles used in merchandise delivery and requiring many stops along a delivery route, or in the case of such motor-propelled vehicles as ground-working machines or concrete mixers which are frequently advanced intermittently at a working or delivery location respectively, and are to be positively held at successive positions; this provision for the use of the hydraulic brakes as a holding means for a stopped vehicle usually eliminates the time-consuming positioning and removal of the wheel blocks which are frequently needed if only mechanical emergency brakes are to be relied on. The automatic brake-release under the servo-motor control feature is, of course, restored when the rod 59 is pushed back to reopen the valve 54.

With the hydraulic brakes set and the suction line 52 open and the stem 36 withdrawn, the starting of the engine is automatically operative through the servo-motor to open the check valve 21 to automatically provide for a release of the brakes and their subsequent pedal control. If, however, the engine is not operating or the suction line 52 is closed off, the set brakes may be released by pulling out the rod 71 to actuate the thrust stem 36 to effect a valve-opening displacement of the valve stem 24 through the action of the lever 66. Such an opening of the check valve may be temporary, or may be maintained for as long as may be desired by disposing the pin 75 of the rod 71 in the side notch 74' at the outer end of the slot 74, it being recalled that the spring 44 constantly urges an inoperative positioning of the stem 36 and an inward positioning of the control rod 71. With reference to a setting of the brakes through the operation of a foot pedal 11, or other means, while the check valve 21 is in operative condition, it will be understood that any desired holding pressure may be created and held at the wheel brakes by repetitively operating the primary pressure-creating means, whereby the latter must sustain the holding pressure only while the holding pressure is being built up and is thereafter not subject to a constant high pressure while the brakes are held set in holding condition by the pressure between them and the check valve 21.

From the present specific showing and description, it will be understood that the hydraulic setting and holding of vehicle brakes are arranged to be controlled under both normal and emergency vehicle-operating conditions in a particularly simple and effective manner, and with a minimum manipulation of auxiliary controls as represented solely by the hand control rods 59 and 71. Also, while the suction-line valve 54 and valve-control stem 36 are particularly disclosed as arranged to be controlled by the rods 59 and 71 from the members 65 and 73 at an instrument panel 62, the control of either the valve or control stem might be effected from other locations and through other suitable means within reach of the vehicle operator, as at the floor, on the steering post, etc. It will also be understood that the actual installation of a present control unit 7 with respect to the hydraulic brake system of a vehicle is variable as required for cooperatively associating a unit and its manual controls with different hydraulic brake arrangements provided with different makes of motor vehicles. The present control device is also understood to be applicable to controlling a hydraulic brake for a single element such as a flywheel or a shaft.

From the foregoing description taken in connection with the accompanying drawings, the advantages of the present hydraulic brake control device will be readily understood by those skilled in the art to which the invention appertains. While we have described an arrangement which we now consider to be a preferred embodiment of our invention, we desire to have it understood that the showing is primarily illustrative, and that such changes and developments may be made, when desired, as fall within the scope of the following claims.

We claim:

1. In a hydraulic brake system for an engine-propelled vehicle, a single check valve means normally operative for retaining fluid under pressure between it and the brake cylinder, means manually and releasably settable to render the valve means inoperative, and means independently actuatable by the vehicle engine solely during and by reason of its operation to render the valve means inoperative.

2. In a hydraulic brake system for an engine-propelled vehicle, means normally operative for retaining fluid under pressure between a pressure source and each brake cylinder, a release means for said retaining means operative by the vehicle engine solely during and by reason of its operation, and a second release means for said fluid-retaining means operative manually and independently of the first release means.

3. In a hydraulic brake system for an engine-propelled vehicle, means normally operative for retaining fluid under pressure between a pressure source and each brake cylinder, a release means for said retaining means normally operative by the vehicle engine solely during and by reason of its operation, a second release means for said fluid-retaining means operative manually and independently of the first release means, and a means manually operable to render the first release means inoperative.

4. A structure in accordance with claim 2 in which the last means is releasably settable to maintain the inoperative condition of the first release means.

5. A locking device for the brakes of a manually settable hydraulic brake system of an engine-propelled vehicle, comprising a spring-loaded check valve interposed in said system for normally preventing a return flow of liquid therein from the set brakes, means normally controlled by the vehicle engine for automatically opening said valve by reason of the operation of the engine, and manual means for opening said valve independently of the engine-controlled means.

6. A locking device for the brakes of a manually settable hydraulic brake system of an engine-propelled vehicle, comprising a spring-loaded check valve interposed in said system for normally preventing a return flow of fluid therein from the set brakes, means normally controlled by the vehicle engine for automatically opening said valve solely during the operation of the engine, and manual means for temporarily rendering said valve-opening means inoperative.

7. A locking device for the brakes of a manually settable hydraulic brake system of an engine-propelled vehicle, comprising a spring-loaded check valve interposed in said system for normally preventing a return flow of fluid therein from the set brakes, means normally controlled by the vehicle engine for automatically opening said valve solely during the operation of the engine, a manually operative means for opening said valve independently of the engine controlled means.

8. In a braking mechanism, a fluid-actuated brake unit, a source of fluid pressure, conduit means for connecting the source of pressure to the brake unit, a check valve normally operative in said conduit means for preventing the return flow of fluid from the brake unit to the source of pressure, a control means for the check valve comprising a vacuum-operated servo-motor connected to open the valve, a source of suction, a conduit connecting the source of suction to the vacuum-operated motor, and a shutoff valve operative in said last conduit for its manual closing to prevent a suction operation of the servo-motor to open the check valve.

9. In a braking mechanism, a fluid-actuated brake unit, a source of fluid pressure, a conduit connecting the source of pressure to the brake unit, a check valve normally operative in said conduit for preventing the return flow of fluid from the brake unit to the source of pressure, a control means for the check valve comprising a vacuum-operated servo-motor connected to open the valve, a source of suction, a conduit connecting the source of suction to the vacuum-operated motor, and means manually operative independently of the servo-motor to open the closed check valve.

10. In a braking mechanism, a fluid-actuated brake unit, a source of fluid pressure, a conduit connecting the source of pressure to the brake unit, a check valve normally operative in said conduit for preventing the return flow of fluid from the brake unit to the source of pressure, a control means for the check valve comprising a vacuum-operated servo-motor connected to open the valve, a source of suction, a conduit connecting the source of suction to the vacuum-operated motor, means manually operative independently of the servo-motor to open the closed check valve, and means manually operative to close the suction conduit.

11. The combination with an internal-combustion engine and its intake manifold, a hydraulic braking system having brake-applying means including a source of liquid under pressure, a brake cylinder, a line connecting said source and cylinder, a normally closed check valve in said line and operative to retain the brake in applied condition, control means for said valve comprising a vacuum-operated servo-motor for actuation to open the check valve, and a suction line normally connecting the vacuum chamber of the servo-motor with the engine intake manifold whereby to effect an opening of the check valve while the engine is running.

12. The combination with an automotive propulsion engine and its intake manifold, a hydraulic braking system having brake-applying means including a master-cylinder, a brake cylinder, a line connecting said cylinders, a normally closed check valve in the line between the cylinders and operative to retain the brake in applied condition, control means for said valve comprising a vacuum-operated servo-motor connected to open the check valve and having its suction chamber provided with a normally-closed vent to the atmosphere, a normally open suction line connecting the vacuum chamber of the servo-motor with the engine intake manifold whereby to effect an opening of the check valve while the engine is running, and a valve means operative in the vent and suction lines and alternatively settable to simultaneously open the vent line and close the suction line.

ARTHUR C. HAGER.
TED D. JONES.

References Cited in the file of this patent

UNITED STATES PATENTS

| Number | Name | Date |
|---|---|---|
| 770,101 | Nelson | Sept. 13, 1904 |
| 1,967,151 | Lustick | July 17, 1934 |
| 2,183,444 | Collins | Dec. 12, 1939 |
| 2,585,711 | Whitney et al. | Feb. 12, 1952 |